Aug. 6, 1940.  C. B. STRAUCH  2,210,509

METHOD OF FORMING OVER OBJECTS

Filed May 17, 1937  5 Sheets-Sheet 1

INVENTOR

Clauss Burkart Strauch

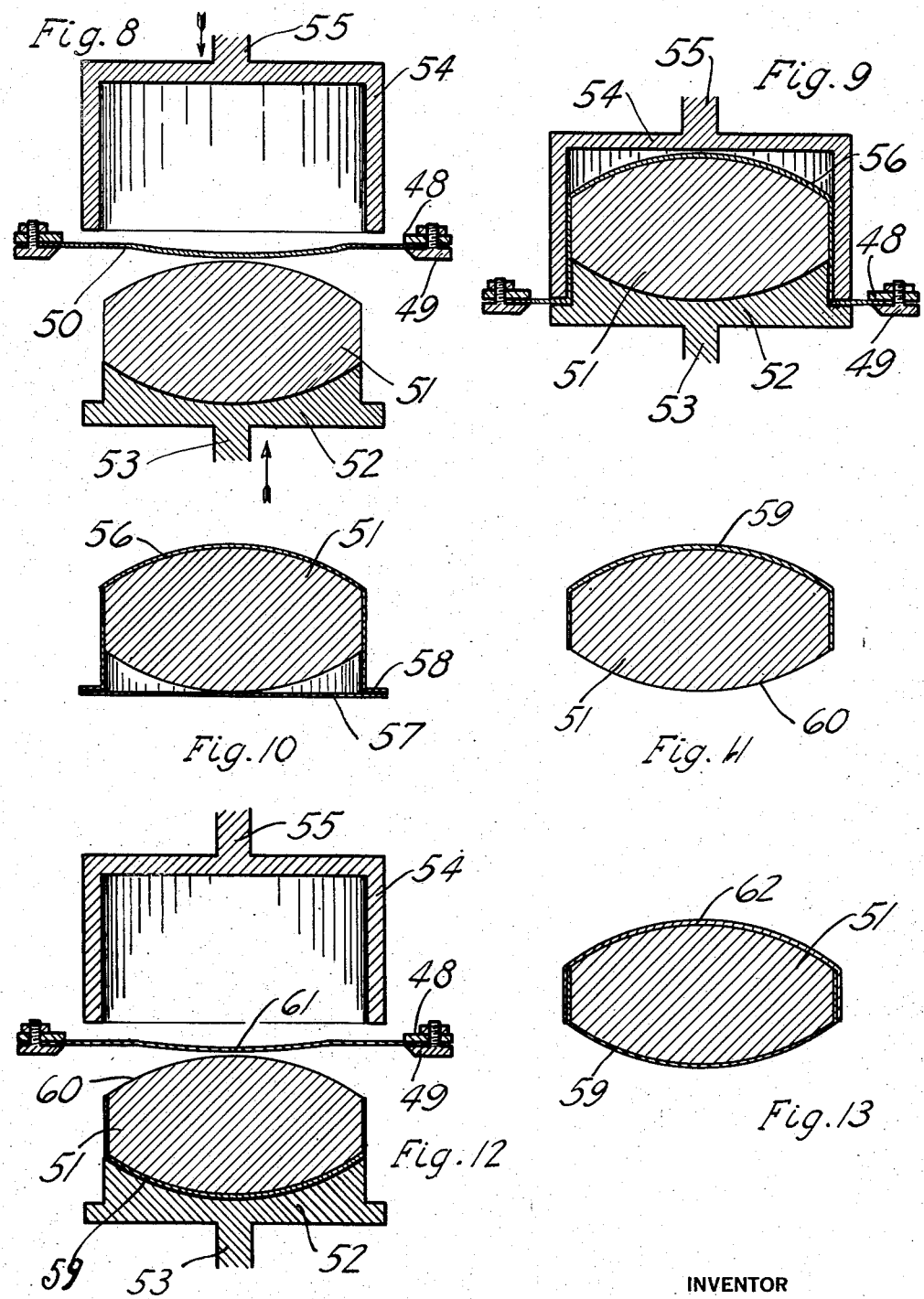

Aug. 6, 1940.  C. B. STRAUCH  2,210,509
METHOD OF FORMING OVER OBJECTS
Filed May 17, 1937  5 Sheets-Sheet 3

INVENTOR
Claus Burhard Strauch

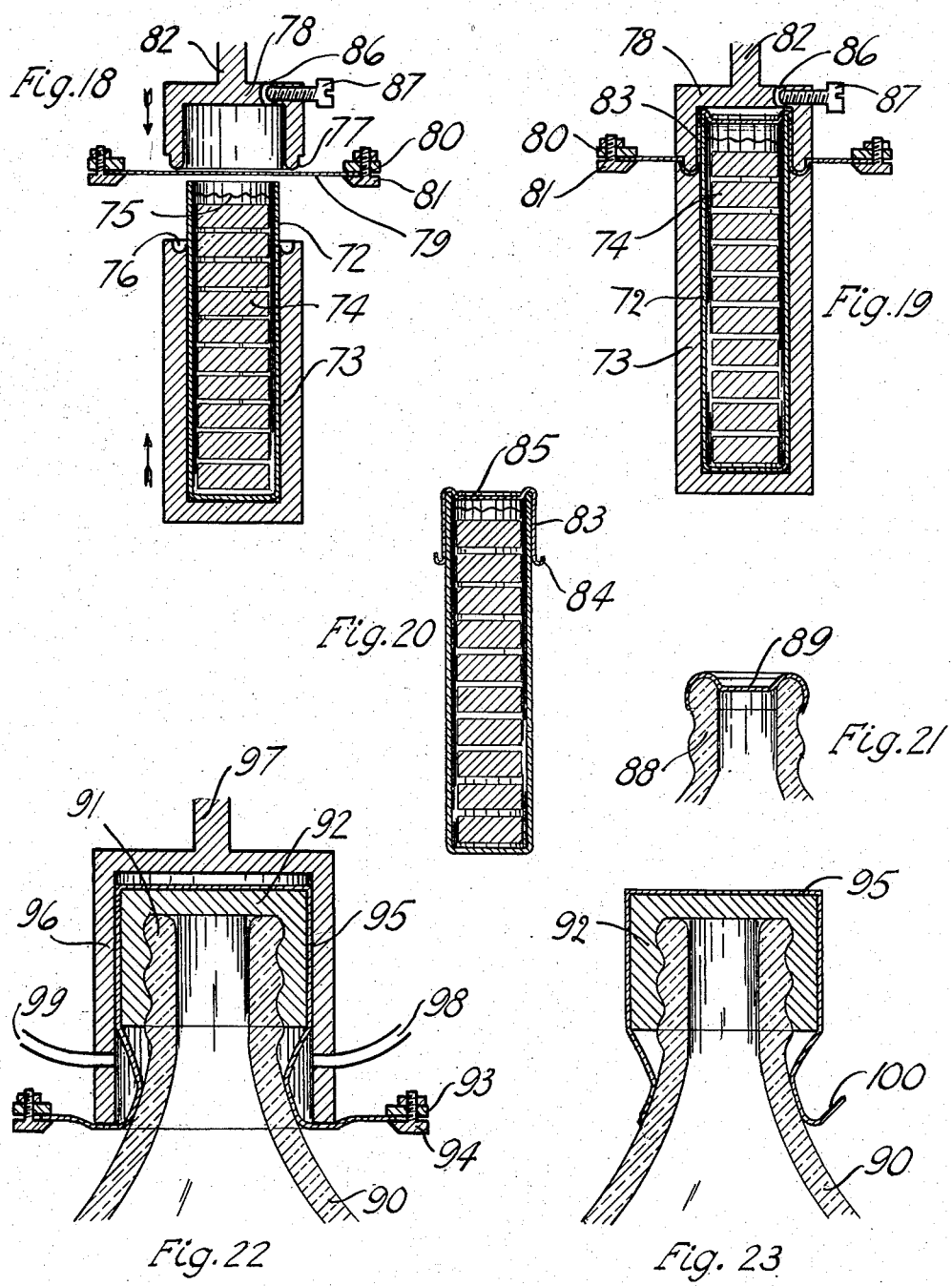

Aug. 6, 1940.   C. B. STRAUCH   2,210,509
METHOD OF FORMING OVER OBJECTS
Filed May 17, 1937   5 Sheets-Sheet 5
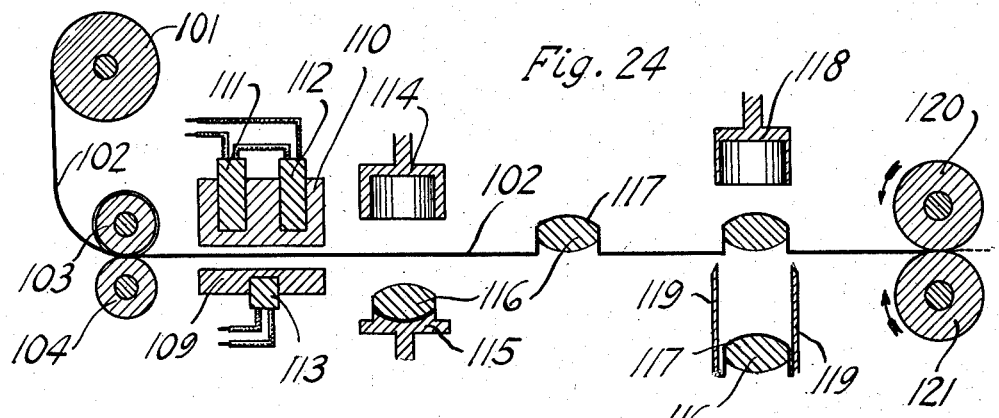
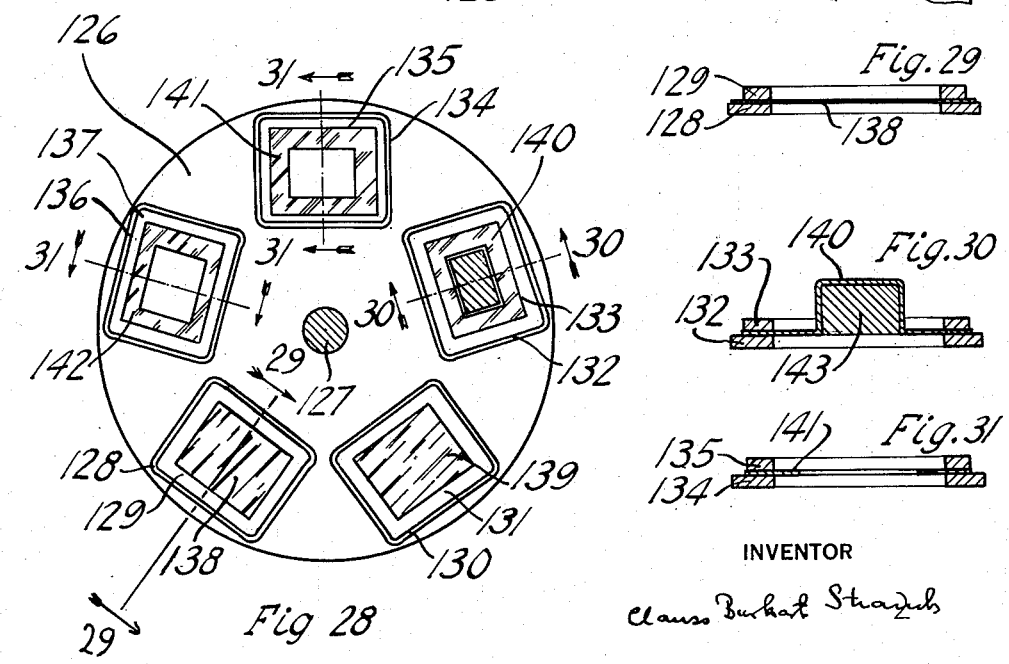
INVENTOR
Clauss Burkat Strauch Patented Aug. 6, 1940

2,210,509

UNITED STATES PATENT OFFICE 2,210,509

METHOD OF FORMING OVER OBJECTS

Clauss Burkart Strauch, New York, N. Y., assignor to Hartford-Empire Company, Hartford, Conn., a corporation of Delaware Application May 17, 1937, Serial No. 143,115

8 Claims. (Cl. 18—56)

This application is a continuation in part of my copending application Serial No. 56,905 filed December 31st, 1935, entitled "Continuous thermoplastic forming," and is related to my copending applications entitled "Thermoplastic forming," "Formed packages," and "Packaging in formed pockets," Serial Nos. 143,113, 143,114, and 143,116 respectively, filed under the same date as this application. My present invention relates to a novel method for forming and molding thin-walled casings comprising thermoplastic and preferably transparent materials directly over objects as covers or containers, and also relates to special casings and closures produced by this process.

For the purpose of producing thin-walled casings of elastic, smooth and preferably transparent material for cigarette tips, containers and similar purposes, it is my invention to hold taut a desired part of a thermoplastic sheet such as may be made from cellulose acetate, vinylic or acrylic resins or similar materials, heat the held part, quickly transfer it to cooler dies which form the material and set the formed material in rapid succession.

My pending application Serial No. 241,722, describes this process developed for use in an automatic machine and as a continuous process, employing preferably the plastic material in band shape from rolls, and forming it by cooler dies and also describes the same process adapted for forming thermoplastic material as sheets or blanks by cooler dies in manual or semi-automatic production.

I have found that my invention of forming a heated part of a thermoplastic sheet held taut against undesired deformation is applicable to molding such sheet material directly over objects and without the use of dies, or at least complete dies. My invention permits the covering of articles such as paper boxes, soaps, cigars, the necks of bottles and vials, tablets and many other objects directly and intimately by a closely fitting protective cover, preferably transparent, smooth, hygienic, elastic and fitted individually to the object without regard to the variations of its shape and size. Such formation is not possible in the manufacture of coverings made from cardboard, glass and many other materials. The use of moisture and evaporation-proof thermoplastic materials such as the sheeting available made from vinyl resins affords a protection to the covered article comparable in many of its qualities to a covering of metal, but superior by reason of low cost, intimately fitting shape, attractive color, light weight and transparency. Compared with wrappers and packages made from "Cellophane," a flat, non-plastic, transparent cellulose sheeting, casings made according to my invention offer the advantage of being actually formed according to the individual shape of the object to be packaged, not merely folded and glued as is done when "Cellophane" is used. My invention provides a rather stiff and resisting casing for the article covered, greatly superior to the relatively soft "Cellophane" wrappings. Furthermore many new uses are opened by my invention such as bottle closures, not obtainable by the use of "Cellophane."

With the foregoing and with other objects in view which will appear as the description proceeds, the invention consists in the novel features hereinafter described in detail, illustrated in the accompanying drawings and more particularly pointed out in the appended claims.

In the drawings:

Fig. 8 is a view substantially in vertical section and similar as to the stage of the process to Fig. 4, showing a differently shaped object in position to be encased by a casing formed from a sheet held in a frame similar to that shown in Figs. 1 and 2;

Fig. 9 is a similar view of the parts of Fig. 8, the dies having been moved together to form the sheet around the object;

Fig. 10 is a view substantially in central vertical section showing the object encased as shown in Figs. 8 and 9 and with the casing closed by a flat sheet;

Fig. 11 is a view similar to Fig. 10, but with the formed casing cut off at a different position preparatory to the encasing of both sides of the object in shaped casings;

Fig. 12 is a view similar to Fig. 8, but with the object of Fig. 11 in position to be encased on the other side;

Fig. 13 is a similar view of the completely encased article resulting from the process illustrated in Figs. 8, 9, 11 and 12;

Fig. 18 is a view in substantially central vertical section illustrating a vial filled with tablets arranged to be closed by a formed portion of a sheet in a manner similar to the encasing processes illustrated in the preceding figures, the parts being in a position corresponding to the positions shown in Figs. 4, 8 and 12;

Fig. 19 is a view similar to that of Fig. 18, but with the dies together to shape the casing around the open end of the vial;

Fig. 20 is a similar view of the vial and closure after the latter has been shaped and severed from the remainder of the sheet;

Fig. 21 is a fragmentary view substantially in central vertical section of the top or neck portion of a glass bottle provided with a liner or cap formed from a sheet by a process similar to that illustrated in the preceding figures;

Fig. 22 is a fragmentary view of the neck portion and a screw cap applied on a glass bottle all being encased by a plastic material casing surrounding the neck and cap on the bottle, a female mold being shown in position to form the casing;

Fig. 23 is a view similar to Fig. 22 showing the completed casing surrounding the end of the bottle after it has been severed from the sheet from which it was formed;

Fig. 24 is a diagrammatic view substantially in central longitudinal section illustrating the process of coating articles, such as shown in Fig. 8;

Fig. 25 is a view substantially in transverse vertical section illustrating the manner in which the edge portions of the sheet are bent downwardly to provide holding portions for preventing undesired distortion or deformation of the center portion of the sheet during the heating thereof;

Fig. 26 is a view similar to Fig. 20 showing a vial, the top of which has been encased as illustrated in Figs. 18 and 19 in readiness for the casing to be severed from the remainder of the sheet;

Fig. 27 is a fragmentary view in plan of a strip or ribbon of plastic material, portions of which have been formed as illustrated in the preceding figures, particularly Fig. 24, and cut out leaving the remaining portion of the sheet;

Fig. 28 is a more or less diagrammatic view in plan illustrating a device by which the process of the preceding figures may be practiced with blanks cut from a sheet or ribbon and held in frames mounted on a rotatable table;

Fig. 29 is a fragmentary view in vertical section on the line 29—29 of Fig. 28;

Fig. 30 is a similar view in vertical section on the line 30—30 of Fig. 28; and

Fig. 31 is a similar view in vertical section on either of the lines 31—31 of Fig. 28.

Figure 1:
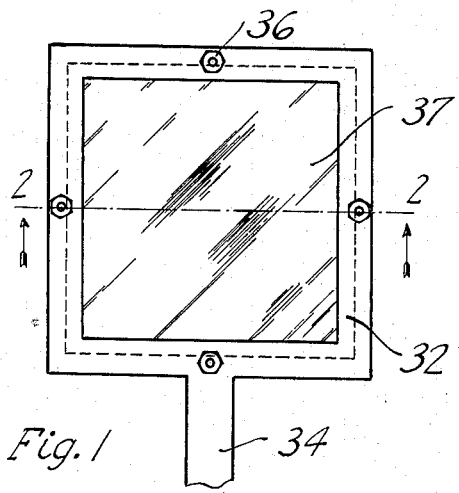
Figure 1 is a view substantially in plan showing a sheet of thermoplastic material held in the frame, clamping the sheet around its entire periphery and leaving the central portion exposed for softening and forming operations.

Figs. 1 to 7 demonstrate my invention used for molding a casing of thermoplastic material directly over a cardboard top of a powderbox. In Fig. 1 there is illustrated a preferred form of a gripping appliance to hold the thermoplastic material flat and to prevent it from undesired distortion and contraction. This appliance comprises a frame 32, which rests on a corresponding frame 33 having a handle 34, the frames being united by screws 35 and nuts 36 and gripping between them the edges of a thermoplastic blank 37 so as to expose the center portion of the sheet in the window of the frame. The frame permits the holding of the thermoplastic sheet while it is being heated, prevents undesired distortion and contraction thereof and allows the movement of the softened sheet with speed and precision to the forming means. The frame may also be of any other shape such as round. The gripping hold of the frame may be non-yielding by means of applied pressure or may involve a construction using rectangular slots as described later in respect to Fig. 25 or may be elastic and yielding, so as to permit the sheet to contract on heating and to follow the dies on forming to some degree. I prefer to hold the blank by all its peripheral edges. I found, however, in forming articles from rectangular blanks, a gripping of two opposed sides sufficient for some purposes, permitting the two sides not held to shrink, and thereby increasing the thickness of the sheet to be formed. It is part of my invention also optionally to provide the blank 37 with cuts, as for instance, rectangular cuts along the inside of the frame and severing the blank in approximately ¼ of the exposed length from each corner, leaving the center half of the blank on each side intact and held, but permitting the four corners to contract on heating into the substance of the center portion of the blank from which an article is to be formed. This subject matter is illustrated in my copending application, Serial No. 241,722, filed Nov. 22, 1938.

Figure 3:
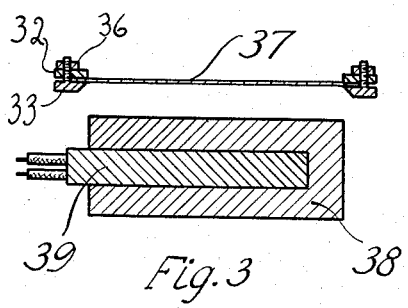
Fig. 3 is a diagrammatic view substantially in vertical section similar to Fig. 2 and showing the sheet held above a heating means.

In Fig. 3 the frame 32—33 is shown held over a heater, comprising in its preferred form a block 38 provided with an electric heating unit 39. The heat given off by the block 38 will quickly soften the thermoplastic blank 37, the holding frame permitting the blank to be softened to a point that it is nearly liquid without undesired distortion or contraction and still being subject to instant transfer. The heating block 38 may be supplemented by a similar heater (not shown) above the sheet; or radiant heat from a coil may be used.

Figure 5:
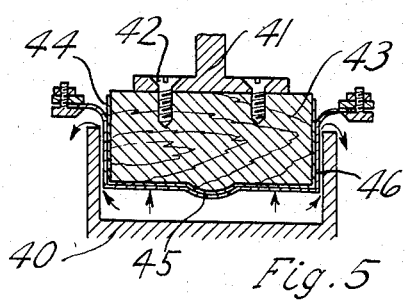
Fig. 5 is a view similar to Fig. 4, showing the dies approaching one another and shaping the sheet.
Figure 4:
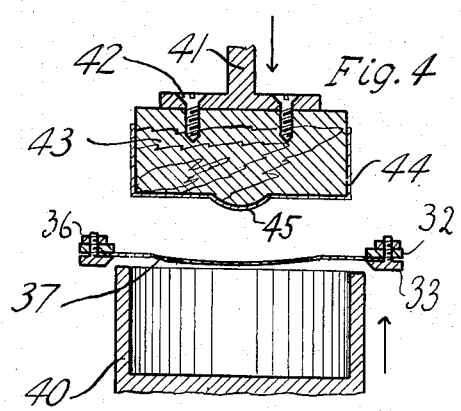
Fig. 4 is a view similar to Figs. 2 and 3, showing the heated sheet in position between shaping dies; the male die comprising the object to be coated.
Figure 6:
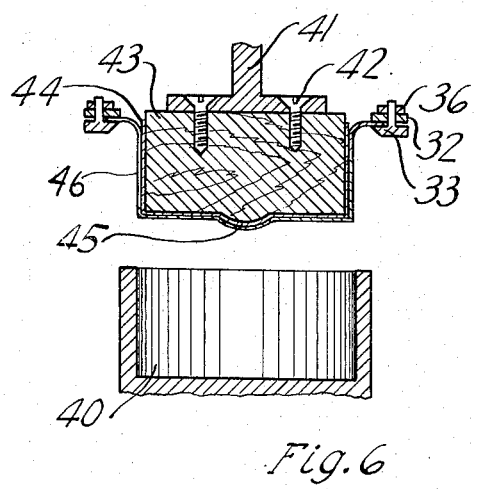
Fig. 6 is a view similar to Figs. 4 and 5 showing the female die removed from the sheet, which has been shaped around the object.

In Figs. 4 to 6 there is illustrated a female die 40 and a male die comprising a shaft 41, to which is attached by screws 42 a block 43 preferably of wood. Over the block 43 a powder box top 44 optionally decorated by a prominence 45 is pushed and held by friction and atmospheric pressure. Figs. 4 to 6 show the different successive stages involved in the forming operation according to my invention. In Fig. 4, the sheet 37 after leaving the heater 38 with the exposed central portion softened as indicated by a slight sagging of the centre of the sheet, is placed between the female die 40 and the cardboard cover 44 which is used as a male die, both dies being moved towards the sheet 37, as indicated by the arrows, the operation being such as may be effected by the use of a suitable press. In Fig. 5, the cardboard top 44 with its supporting means 41 and 43 is being pressed into the female die 40, both moving as before in respect to the plastic sheet and forming a casing 46 over the boxcover 44 and following intimately the assumed decorative prominence 45, aided by the pressure of the compressed and expressed air as indicated by the arrows.

I have found that a thermoplastic sheet held and made soft and plastic by heat as described has the inherent property of clinging to the male die here represented by the object used as a male die and following intimately the shape of such die or object, the shape of the female die being of lesser influence. The female die, however, being preferably of the shape of a cup without other openings except for the entrance of the corresponding male die, will, after entrance of the male die, contain air which will be compressed by the descending male die and serve to mold the softened material intimately against the entire outer configuration of form of the male die or the object serving as a die, until it escapes between the female die and the formed casing. The formed casing will set almost instantaneously on contact with the substance of the object, which has a temperature substantially lower than the softening point of a thermoplastic material such as cellulose acetate.

Fig. 6 shows the male die and the coated article withdrawn from the female die 40, the boxcover 44 carrying on its surface the formed casing 46 still connected with the frame 32—33 and in readiness to be cut from the unformed remainder of the sheet which is still held in the frame.

Figure 7:
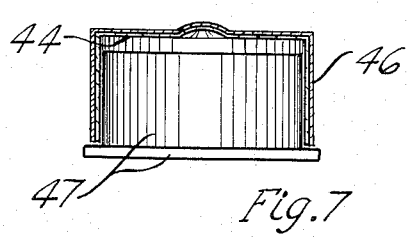
Fig. 7 is a view in substantially vertical section showing the object made or encased by the process illustrated in Figs. 3 to 6.

Fig. 7 shows the complete powder box, consisting of a base member 47 covered by the top 44 carrying the closely fitted casing 46. The above-described operation thus provides the top of the box with a lustrous, moistureproof, transparent, optionally colored, closely fitting, washable, dustproof, stable, permanent, protective cover, greatly superior to other transparent wrappings which are applied by folding a flat sheet of transparent material. Casings applied according to my invention are individually fitted and independent of the variation of sizes found in cardboard containers, can be produced by automatic or semiautomatic machines as diagrammatically illustrated in Figs. 24 and 28 and eliminate all the obstacles and labor connected with the assembly of a delicate, closely fitting cover over an object.

Figs. 8 to 12 illustrate the application of my invention to the packaging of an object such as a cake of soap.

In these figures 48 and 49 represent the upper and lower portions of a frame holding a thermoplastic sheet 50, similar to that described before. 51 is a cake of soap or any other object to be packed, and is held on a support 52, which may be moved by the shaft 53 forming a part of a suitable press. 54 represents a female die, which is also mounted in the press by a shaft 55.

The position of the parts in Fig. 8 corresponds to that shown in Fig. 4, the sheet 50 having been heated and softened to a moldable condition previously and placed in between the dies, are moved together as indicated by the arrows, the female die 54 coming from above and the male die, represented by the object 51 and its support 52, coming from below. Fig. 9 shows the dies 54 and 51 pressed together, the thermoplastic sheet forming a casing 56 on the exposed surface of the object which will set almost instantaneously and is still integral with the edges of the sheet held in the frame 48—49.

The casing 56 fitted over the soap 51 can be cut at any desired level and be used for several types of packages. If this casing is cut as shown in Fig. 10, it can easily be transformed into a closed package by cementing or otherwise sealing a flat sheet 57 of the same or any other material to the flat edges 58 of the casing 56. I found it practical for instance, to form the casing 56 of cellulose acetate or vinyl resins and cement to the edges 58 by the heat-sealing method a flat sheet of a moisture proof and heat-sealing cellulosic material, which is of low cost and easily torn off or broken for opening. For other purposes I have also used a sheet of cellulose acetate for the sheet 57, and glued the same to the surfaces 58, also comprising cellulose acetate by permitting a solvent such as acetone to enter into the space between 57 and 58 by capillary force.

The casing applied as aforesaid may be cut in a manner that the convex surface of the shell including a desired part of the sides as shown in Fig. 11, a casing designated by the numeral 59 will be left on the soap and the balance removed. This casing constitutes a very practical support for protecting the soap against erosion by water when placed on a wet washstand.

The casing 59 cut as shown in Fig. 11, near the lower end of the straight edges, can be covered on the open side by repeating the forming process shown in Fig. 8. Fig. 12 shows the soap 51 with the casing 59 placed on the support 52 so that it rests on the casing 59 and arranged with the surface 60 not covered towards a sheet 61, which is to be formed over it as described before. Fig. 13 shows the soap 51 covered on one side by the casing 59 and on its other side by the casing 62 formed from the sheet 61, the casings 59 and 62 overlapping on the sides, assuring a complete coverage, directly molded over the object, intimately fitting, preferably transparent, dust and germ proof and protecting the odor and substance of the soap better than the packages used before.

Figure 14:
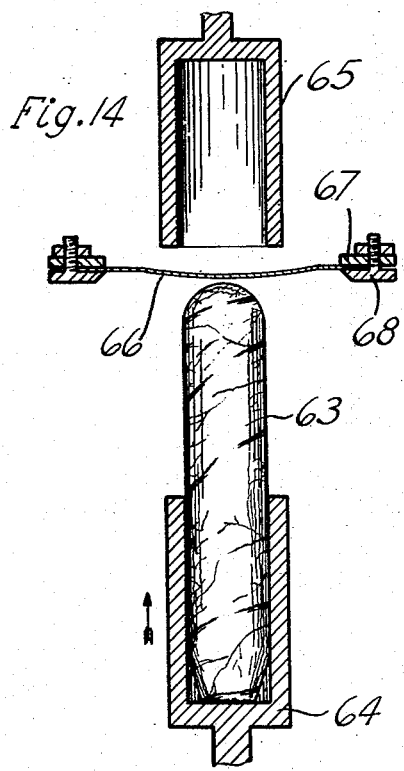
Fig. 14 is a view in substantially vertical section showing a cigar held in a holder and in a position to have the upper portion thereof encased by a process similar to that illustrated in the preceding figures, the figure corresponding generally to Figs. 4, 8 and 12.
Figure 15:
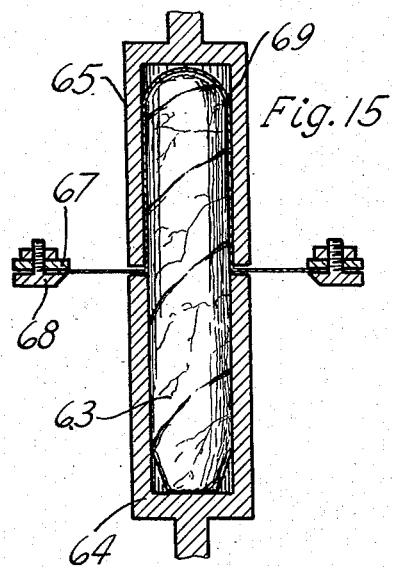
Fig. 15 is a view similar to Fig. 14, the dies having been brought together to shape a sheet around the upper half of the cigar.
Figure 16:
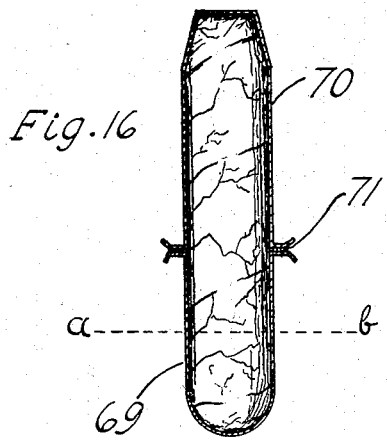
Fig. 16 is a view of the cigar encased from both ends by the process illustrated in Figs. 14 and 15 and the casings sealed around the middle.

The packaging method according to my invention is applicable to practically all objects to be packaged. Even objects which are compressible such as sponges, brushes or cigars can be used to be molded over directly due to the very soft, yielding, plastic, near-liquid consistency of sheets as heated and while held against undesired deformation according to my invention. In Figs. 14 to 16 which illustrate in vertical sectional views the packaging of a cigar, 63 represents a cigar held in a support 64; 65 is a corresponding female die, both movable toward a heated thermoplastic sheet 66, held in frame members 67 and 68 of a suitable holder. Fig. 15 shows a casing 69 formed over one-half of the cigar; while Fig. 16 represents the finished package produced as described before in connection with Figs. 8 to 13, and consisting of two casing 69 and 70 united at their brim or flange portions 71.

Figure 17:
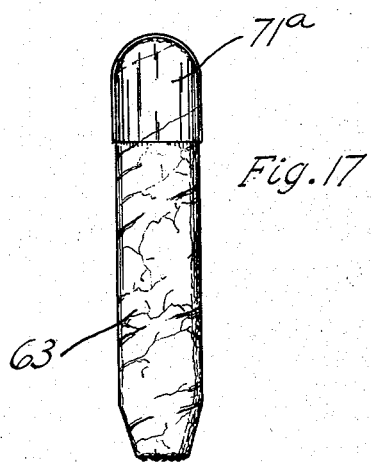
Fig. 17 is a view similar to Fig. 16 of a cigar which has had at least one end encased and cut off on a line as shown at a—b in Fig. 16, leaving the end only encased for use as a holder.

A casing produced according to Figs. 14 to 16 can be made so as to be removed completely before the cigar is smoked. I found it practical also, to have part of the casing 69 stay on the cigar, advising the smoker to cut the cover along the line a—b and to remove only the portion of the casing above this line, leaving on the cigar a covering as shown in Fig. 17 and designated by the numeral 71a, serving as a cigar tip after being perforated by pins or cut in its end in the customary manner, and protecting the lips and mouth of the smoker from contact with tobacco. The same cigar tip 71a as shown in Fig. 17 can also be produced by an initial partial encasing of one end of a cigar by the method or process described.

It is an essential part of my invention to mold directly and individually fit seals over the necks or closures of vials, jars and bottles, forming removable caps, which do not require other closures or liners, and also to apply a secondary protective cover over another closure, to be torn or otherwise removed or cut before opening the container.

Containers made from glass cannot always be made exactly uniform in diameter. The variations in diameter are especially disturbing in shell shaped vials to be closed by non-elastic closures. I have found that my invention permits the molding of an individual cap directly over each vial, affording an intimate and air-tight closure greatly superior in closing qualities, attractiveness and low cost to the aluminum or nickel plated brass caps used at present.

In Figs. 18 to 20 which illustrate removable vial caps, molded individually over each vial according to my method or process, 72 is a vial held in a support 73 and assumed to be filled with the tablets 74 or other material which may be covered by a protective metal foil 75. The brim of the support 73 is optionally provided with a groove 76, which corresponds in shape to an annular portion 77 provided on the lower peripheral edge of a female die 78. Both dies, the vial 72 and its support 73 taking the place of the male die, are moved as indicated by the arrows in Fig. 18 toward a heated and softened thermoplastic sheet 79 held in the portions 80 and 81 of a suitable frame. The upper die 78 is preferably supported by a shaft 82. It is assumed in this example that the frame 80—81 is moved from the heater by hand and also that the male die is moved upwardly by hand into the female die, thus forming the softened sheet over the neck of the vial 72, as shown in Fig. 19 and producing a fitted cap 83. The cap 83 has a tendency to adhere to the glass of the vial 72. I have found that the cap 83 can be made removable, if broken loose from the glass, which is easily accomplished by turning the vial in its axis approximately one-quarter of a turn while the formed cap 83 is still an integral part of the balance of the sheet and held firmly by the frame 80, 81 and before cutting the cap 83 out as shown in Fig. 20. The completed closure, as seen in Fig. 20, has an optional brim 84 and an optional depression 85 produced by the action of the air trapped and compressed within the female die 78 by the forming process. The compression of the air and accordingly the depth of the depression 85 is adjustable by controlling an air-outlet 86 in the female die by a valve 87.

It is part of my invention to form in the same manner as described for the closures of vials, liners and seals covering the openings of bottles, jars and similar containers. Fig. 21 is a vertical sectional view of a bottleneck 88, provided with a liner 89, over which a cap as known in the art may be placed. Liners of this kind hold very tight to the glass, being individually fitted, and can serve, if molded of suitable length to serve as independent closures, similar to the closures described for vials.

In Figs. 22 and 23, which illustrate caps molded according to my invention and by the same process as described before but over another closure already provided on the container, 90 represents a bottle having a neck 91 carrying a conventional screwcap 92. The position of the parts shown in Fig. 22 corresponds to those of Figs. 9, 15 and 19. A heat-softened thermoplastic sheet held in the members 93 and 94 of a suitable frame has been formed and set as a cover 95 by the use of a female die 96, which is held by a shaft 97. I have found that the thermoplastic sheet will follow the shape of the bottle closure fairly closely, but that it is practical, however, in some cases to use split female dies, or other mechanical means to press the softened sheet around the bottle or to effect the same purpose by the application of compressed air entering the female die, before the plastic material has set, as shown in Fig. 22, by the air pipes 98 and 99, or by twisting the bottle while the cap is being formed and is still in a plastic condition. The molded cap 95 is to be cut from the remainder of the plastic sheet still held in the frame 93—94, leaving preferably a tongue 100 on the cap to facilitate the removal thereof.

Caps molded over closures as illustrated in Figs. 22 and 23, correspond in effect to the socalled "Cellocaps" of the trade, consisting of cellolosic material supplied soft and wet and suspended in water. Such caps are applied by being wiped, pushed by hand over the neck of the container, where they will dry in time, then shrinking while dryingto closely fitting caps. My invention has the advantage of eliminating the inconvenient storage in water, the wiping and the delay connected with drying and also eliminating other disadvantages connected with use of a moist cover over containers storing moisture sensitive products, as for instance effervescent tablets. The "Cellocaps" of the trade are, after drying, still subject to softener by water, and do not prevent evaporation. Caps made according to my invention are produced hot, will set almost instantaneously, can also, in contrast to the commercial "Cellocaps," be provided with lips facilitating their removal, are resistant to evaporation, using vinyl or other resins as the thermoplastic sheeting, and can be applied by automatic or semi-automatic machines, as illustrated in Figs. 24 to 31.

My invention includes the arrangement of my method as illustrated in Figs. 1 to 23 for automatic or semi - automatic production. The arrangement for automatic production shown in Fig. 24 corresponds in principle to the process as disclosed in my copending application Serial No. 241,722, using, however, the object to be covered and its support as a male die.

In Fig. 24, 101 is a supply roll of a band of thermosplastic material 102 which is pressed between rolls 103 and 104 to bend the edges of the band 102 downwardly at an angle as shown at 105 in Fig. 25. The bent edges 105 greatly facilitate the holding of the band 102 in rails 106 and 107, the latter being provided with grooves 108 in which the edges 105 are held by a slight pressure exerted by the top rail 106. The rails 106 and 107 are provided on each side of the band 102 preferably throughout the length of the machine shown in Fig. 24, preventing undesired contraction and distortion of the band 102 while the central portion thereof is heated, holding the softened portion of the band while such portion is being formed, and guiding the formed band to the subsequent positions, keeping the band in place but not inhibiting its movement lengthwise of the grooves.

After leaving the rolls 103 and 104, the band 102 passes between heaters, preferably comprising blocks 109 and 110 which are provided with heating units 111 to 113, where the center portion of the band becomes soft and plastic so that it may be formed in the next position by the simultaneous converging movement of a female die 114 and a male die, the latter comprising a support 115 carrying the object to be encased such as the cake of soap 116. The next position shows the object 116 covered by the casing 117. In the next succeeding position the encased object is cut from the strip by a male cutting die 118 and a complementary female cutting die 119. 120 and 121 are rolls of an intermittent feeder, pulling the strip 102 lengthwise through the various positions and gripping between them the band 102 as shown in Fig. 27 after the blanking out of the formed casing, leaving holes 122. The units 114, 115, 118 and 119 are assumed to be connected with the mechanical parts of a suitable machine, not shown, which also turns the feeding rolls 120 and 121 so as to move the band 102 from one position to the next position intermittently the strip being stationary when the dies converge and operate and moving again after the dies have separated and cleared the path. The positions of the parts illustrated in Fig. 24 is that at the end of a movement of the band 102 to the next position and at the beginning of the converging movements of the dies into their forming and cutting positions respectively.

Fig. 26 illustrates a vial 123 in the position after leaving a forming unit, and after being supplied with a cover 124 which is still integral with the band 125. In this position the vial is preferably turned to loosen the cover for easier removal.

Figure 2:
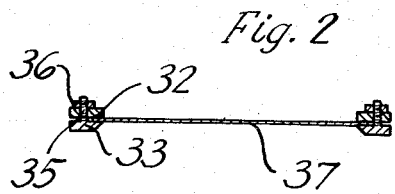
Fig. 2 is a view in vertical section taken substantially on the line 2—2 of Fig. 1.

I found that my novel method or process can also be carried out to advantage in a semi-automatic manner using a turntable on which are arranged blanks of thermoplastic material, as originally described in my copending application entitled "Thermoplastic forming" above referred to. Figs. 28 to 31 illustrate in part such a machine in which my method or process may be carried out as a successive series of operations, using for holding of the blanks a so-called dial turntable, above and below which the various dies are arranged, the dies not being shown in the figure. In Fig. 28, 126 represents a dial plate, rotatable around a shaft 127 and provided with five sets of holding frames 128 to 137. Each of these frames corresponds in purpose to the frame 32—33, and holds a blank during the operations according to my invention. The frames are, in this example, of rectangular shape and are not rigidly held together by screws, but by the weight of the upper frames 129, 131, 133, 135 or 137 or by springs, not shown. The operations on the blanks 138 to 142 held in the frames 128 to 137, are identical to the several steps of the method described before: Fig. 2 corresponding to Fig. 29 and blank 138; Fig. 3 to blank 139; Fig. 9, to Fig. 30 and blank 140; Fig. 27, to Fig. 31 and blanks 141 and 142. The dies operating on the blanks are not shown. The dial plate 126 is turned one-fifth of a revolution after each operation, permitting laterally stationery dies to repeat the same operation successively on each blank. The several operations themselves correspond to those of the methods described before. Accordingly the blank 138 is inserted in the frame 128—129; the blank 139 is simultaneously being heated to a plastic or moldable condition; the blank 140 is simultaneously being formed over an object 143 and at the next dwell position of the dial plate is cut out from the portion held in the frame, leaving the edge portions 141 and similar portions shown at 142 in the last position to be removed from the frames.

Without leaving the principle of my invention, the successive operations may also be arranged on the surface of a wheel, or any other desired form, while the forming action may be aided by water or compressed air, suction or other forces known in the art.

In the first portion of this specification, I have set forth the advantages of the invention over the known systems. While I have disclosed what I consider to be some preferred embodiments of the invention in such manner that the same may be readily understood by those skilled in the art, it is manifest that changes may be made in the details disclosed without departing from the spirit of the invention as expressed in the claims.

What I claim and desire to secure by Letters Patent is:

1. The method of forming a film casing over an object, which comprises the steps of heating a sheet of organic plastic material at one zone to a temperature such that the material is rendered plastic and moldable while preventing deformation of the heated portion of the sheet, which might otherwise occur, by holding portions of the sheet arranged about the heated portion against substantial relative movement, moving the heated sheet to a forming zone spaced from the zone at which the sheet is heated while it is so held, relatively moving the sheet and the object to be encased at the forming zone to cause the sheet to encase a desired portion of the object while bringing pressure to bear on the sheet tending to form it around the portion of the object to be encased, and rigidifying the portion of the sheet encasing the object during the forming thereof so that it will retain the shape thus imparted thereto.

2. The method according to claim 1 wherein the means for applying pressure to shape the sheet of plastic material about the object comprises a female die shaped substantially complementarily to the object to be encased, this die being maintained at a temperature sufficiently different from that of the sheet so as to assist in rigidifying the material of the sheet during the shaping thereof, and wherein the casing about the object is formed from a selected portion only of the sheet of plastic material and is cut from the remainder of the sheet subsequent to the shaping thereof about the object.

3. The method of forming a removable cap about the opening of a container such as a vial, comprising heating a selected portion of a sheet of organic plastic material sufficiently to render it plastic and moldable, while preventing undesired deformation of the heated portion of the sheet, relatively moving the container for which a cap is to be made and the heated portion of the sheet to cause the container to engage one side of such portion of the sheet and move it out of the plane of the original sheet, concomitantly shaping the heated and softened portion of the sheet to encase the end of the container in contact therewith by a female die engaging the side of the sheet opposite that engaged by the container, rotating the container about the axis of the portion thereof encased by a part of the sheet as aforesaid to free it from adhesive contact with the sheet, and cutting the cap forming portion of the sheet thus shaped from the remainder of the sheet.

4. The method of forming casings about selected portions of articles, comprising the steps of passing a band of thermoplastic organic material along a predetermined path, heating a central portion of the band at one zone of said path to bring it to a plastic and moldable condition, while holding the unheated lateral edges thereof against relative movement to prevent undesired deformation of the heated portion, which might otherwise occur, moving the heated portion of the band to another zone of said path while still holding the lateral edges thereof against relative movement so as to continually to prevent undesired deformation of the heated portion, relatively moving the heated portion of the band at the second-named zone of said path and an article to be encased in such manner as to form a part of the heated portion of the band over the article, extracting sufficient heat from the formed portion of the band during the actual forming thereof as to rigidify the formed portion of the band, and simultaneously heating one portion of the band and forming another portion thereof over an article as aforesaid in the successive encasing of a plurality of articles.

5. The method of forming casings over objects from thermoplastic sheet blanks, comprising the steps of holding a plurality of blanks in a corresponding number of frames arranged for movement in an orbital path, moving the frames with the blanks therein through said path so as to bring the frames successively to a plurality of operating positions, successively heating the blanks at one of said positions to a temperature sufficient to soften the thermoplastic material thereof and to render it plastic and moldable, while preventing undesired deformation of the material, which might otherwise occur, by holding perimetral portions thereof by said frame, successively forming the blanks about the objects at another of said positions in said path, extracting sufficient heat from the formed portions of the blanks during the actual forming thereof as to rigidify such formed portions, and successively severing the portions of the blanks encasing objects from the remainders of the blanks at still another of said positions, whereby the various different operations aforesaid may take place in an overlapping time relation due to their being performed at different positions of said path.

6. The method of claim 1 wherein there is used a sheet of organic thermoplastic material which is less inflammable than cellulose nitrate, and wherein the heating of the sheet to a plastic and moldable condition is effected by supplying heat to both faces of the sheet to bring it up to a temperature higher than the ignition point of cellulose nitrate.

7. The method of forming a shaped cavity in a sheet of organic thermoplastic material, comprising the steps of heating a selected portion centrally of the sheet to a plastic and moldable condition while preventing undesired deformation of the heated portion of the sheet by holding certain at least of the unheated portions of the sheet around the heated portion against relative movement, shaping the heated portion of the sheet by the application of mechanical pressure to both faces of the sheet, subjecting the opposite faces of the sheet to differential gaseous pressure prior to the rigidification of the material of the heated portion of the sheet being shaped to assist the mechanical pressure in forming the sheet to a desired shape, and extracting sufficient heat from the formed portion of the sheet during the actual forming thereof as to rigidify such formed portion and cause it to retain the shape imparted thereto.

8. The method according to claim 7, wherein the mechanical pressure is supplied by a male die element engaging one face of the sheet and comprising an object to be encased by the shaped portion of the sheet and a female die engaging the other face of the sheet, and wherein the differential gaseous pressure is applied by supplying positive superatmospheric pneumatic pressure between the female die and the sheet being formed prior to the rigidification of the heated portion of the sheet.

CLAUSS BURKART STRAUCH.